(Model.) 6 Sheets—Sheet 1.
F A. JONES.
PRESSURE REGULATING VALVE.
No. 356,318. Patented Jan. 18, 1887.
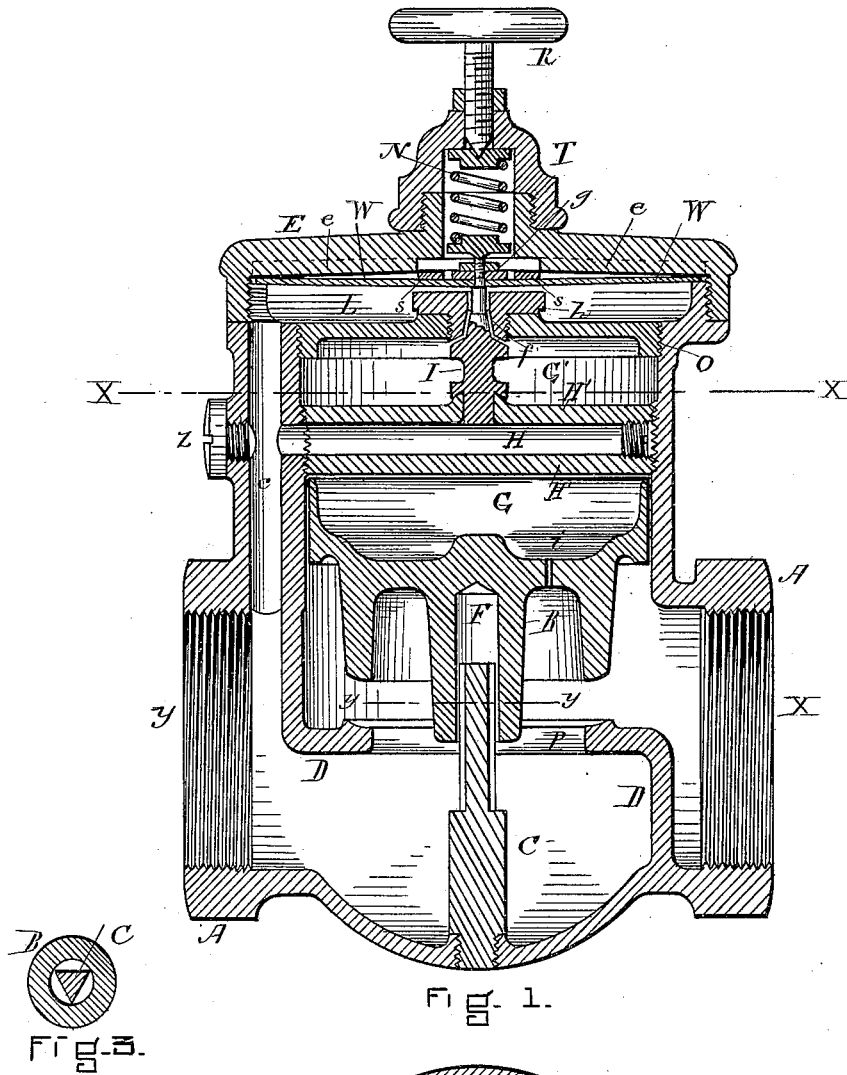
Fig. 1.
Fig. 3.
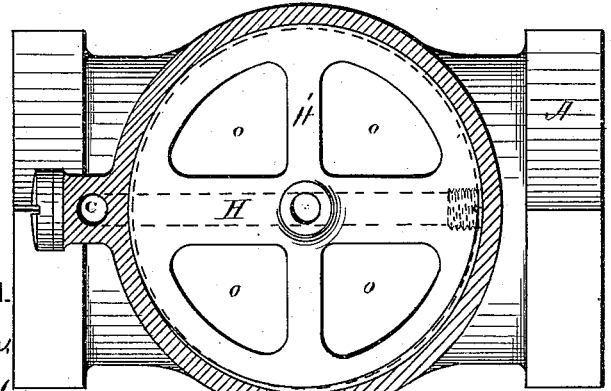
Fig. 2.
WITNESSES.
M. W. Frothingham
John F. Wakefield
INVENTOR.
Florentine A. Jones (Model.)

6 Sheets—Sheet 2.

F. A. JONES.
PRESSURE REGULATING VALVE.

No. 356,318. Patented Jan. 18, 1887.

WITNESSES.
M. W. Frothingham
John F. Wakefield

INVENTOR.
Florentine A. Jones.

(Model.)

6 Sheets—Sheet 3.

F. A. JONES.
PRESSURE REGULATING VALVE.

No. 356,318. Patented Jan. 18, 1887.

WITNESSES.
M. W. Frothingham.
John F. Wakefield.

INVENTOR.
Florentine A. Jones.

(Model.)

6 Sheets—Sheet 4.

F. A. JONES.
PRESSURE REGULATING VALVE.

No. 356,318. Patented Jan. 18, 1887.

WITNESSES.
M. W. Frothingham.
John F. Wakefield

INVENTOR.
Florentine A. Jones.

(Model.) 6 Sheets—Sheet 5.
F. A. JONES.
PRESSURE REGULATING VALVE.

No. 356,318. Patented Jan. 18, 1887.

WITNESSES
M. W. Frothingham.
John F. Wakefield

INVENTOR.
Florentine A. Jones (Model.) 6 Sheets—Sheet 6.

F. A. JONES.
PRESSURE REGULATING VALVE.

No. 356,318. Patented Jan. 18, 1887.

WITNESSES.
M. W. Frothingham
John F. Wakefield

INVENTOR.
Florentine A. Jones

United States Patent Office.

FLORENTINE A. JONES, OF MALDEN, MASSACHUSETTS.

PRESSURE-REGULATING VALVE.

SPECIFICATION forming part of Letters Patent No. 356,318, dated January 18, 1887.

Application filed May 8, 1886. Serial No. 201,506. (Model.)

*To all whom it may concern:*

Be it known that I, FLORENTINE A. JONES, a citizen of the United States, residing at Malden, in the county of Middlesex and State of Massachusetts, have invented certain new and useful Improvements in Pressure-Regulating Valves, of which the following is a specification.

My invention relates to valves for the purpose of controlling, reducing, and regulating the supply or pressure of steam, water, and other fluids in pipes, reservoirs, cylinders, and other vessels.

The object of my invention is to obtain a more perfect balance of the secondary valve by which the operation of the principal valve is effected, or, in other words, to render the secondary valve independent of any and all variations of pressure, in and of itself alone considered; furthermore, to devise means whereby a diaphragm may be prevented from setting or from being destroyed by undue pressure or negligence.

My invention consists in the construction of a chamber or chambers relative to a secondary valve, so that any increase or decrease of pressure or pressures or the relative increase or decrease of different pressures will not disturb the equilibrium of said secondary valve in its operation of or by the operation of the main valve, or to reduce to a minimum the liability of the equilibrium of the secondary valve being deranged by varying pressure or pressures.

My invention furthermore consists in the construction and application of certain means whereby a diaphragm is protected from derangement and destruction.

Figure 4:
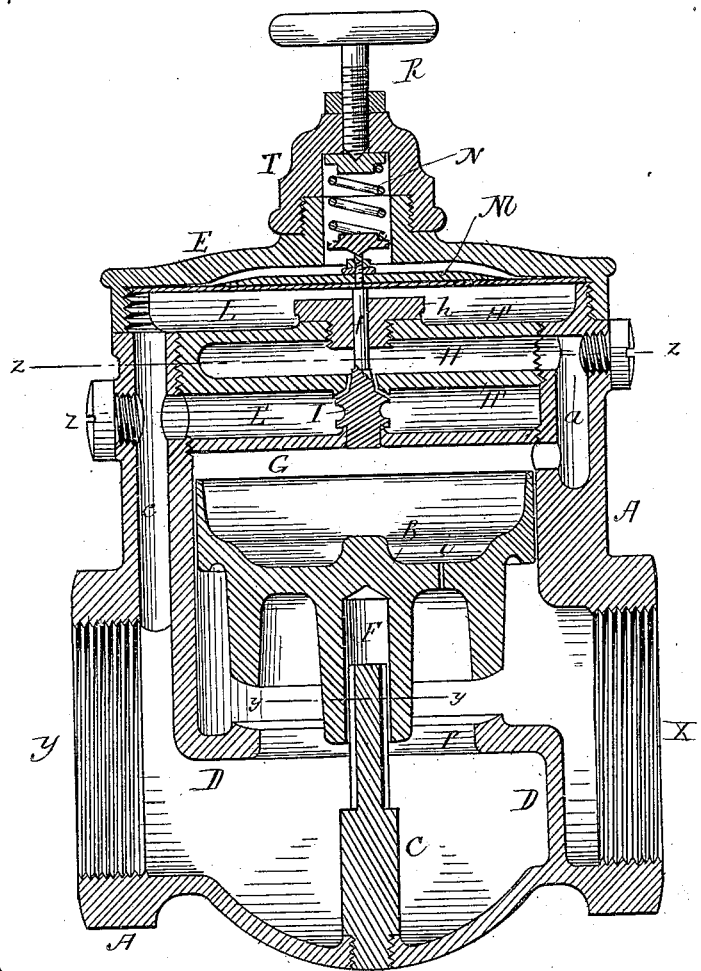
Figure 6:
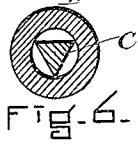
Figure 5:
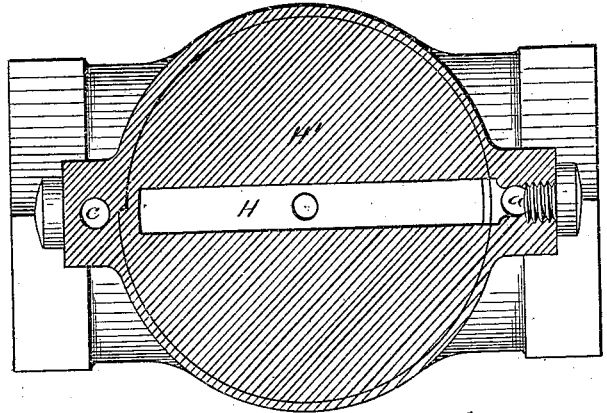
Figure 7:
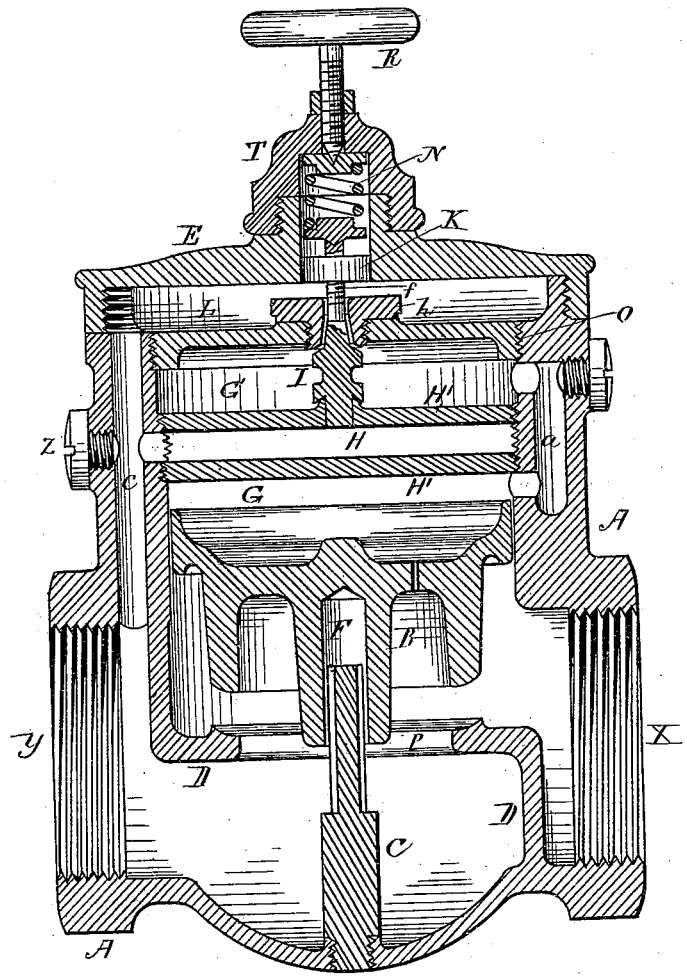
Figure 8:
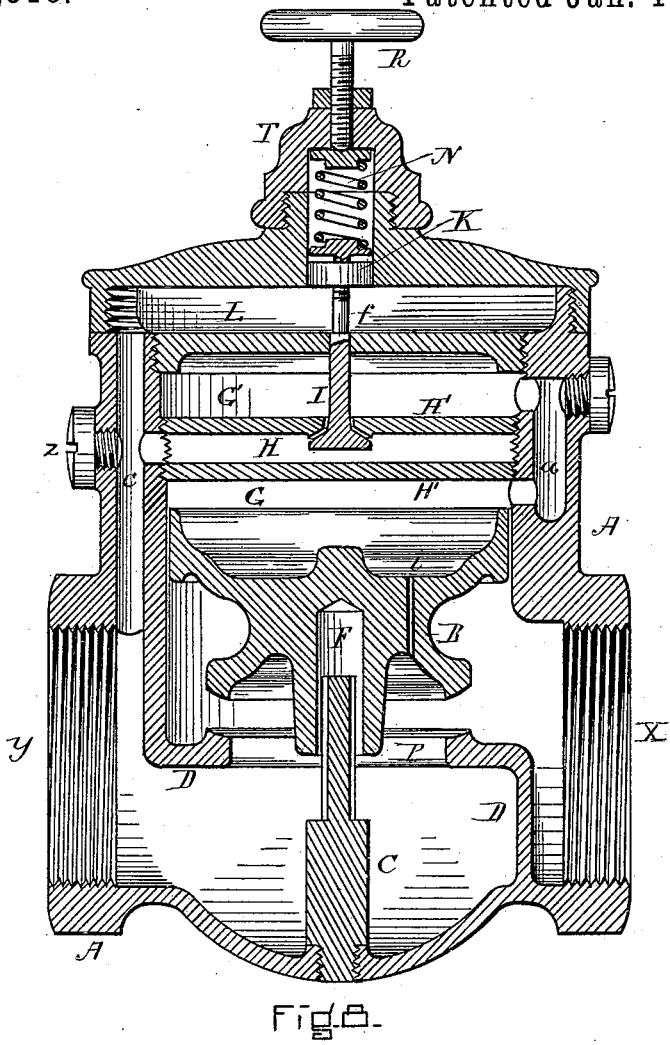
Figure 9:
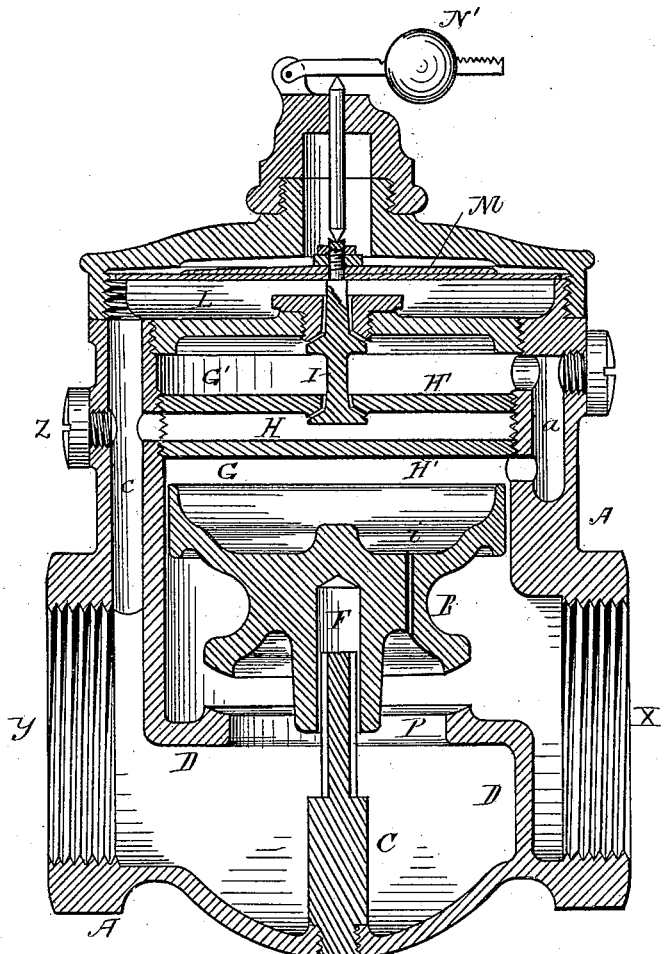
Figure 16:
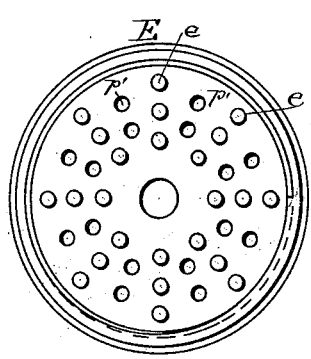
Figure 17:
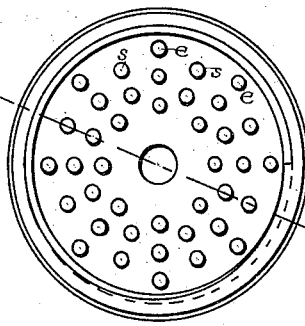
Figure 18:
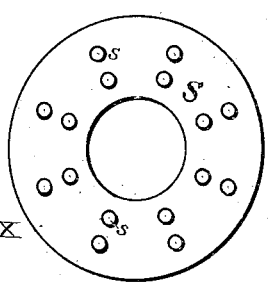
Figure 19:
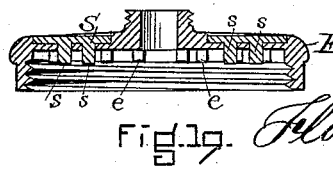
Figure 10:
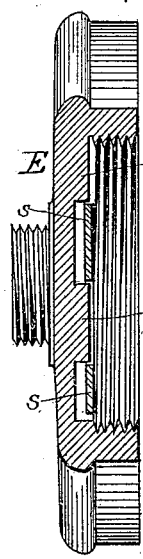
Figure 11:
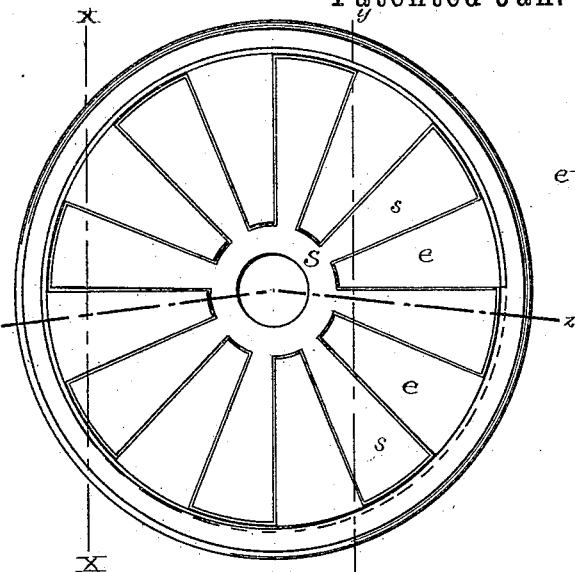
Figure 12:
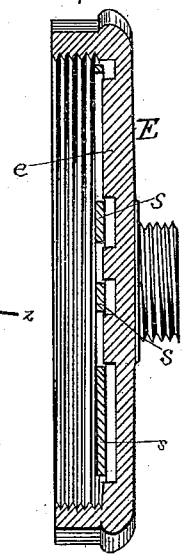
Figure 13:
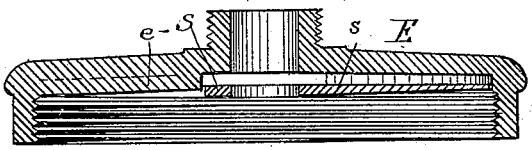
Figure 14:
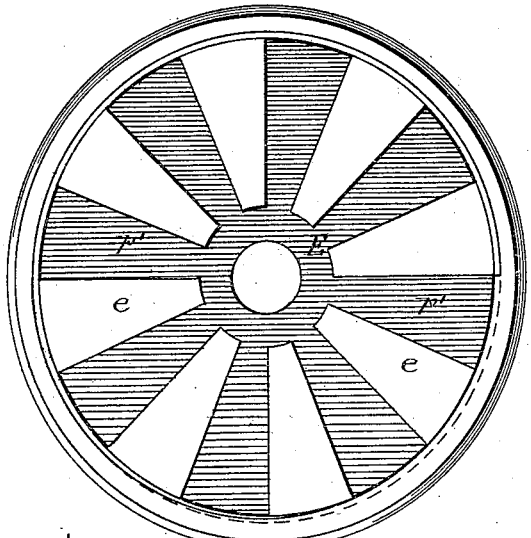
Figure 15:
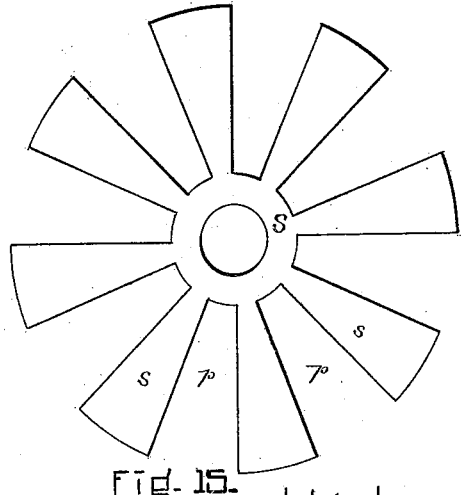

In the accompanying drawings, in which similar letters of reference indicate like parts, Figure 1 is a vertical section of my improvement applied to a pressure-regulator. Fig. 2 is a horizontal section on line $x\,x$ of Fig. 1, showing chamber H, with passages $o\,o$ each side. Fig. 3 is a horizontal section on line $y\,y$ of Fig. 1, showing the form of the guide C within the valve B. Fig. 4 is a vertical section of a pressure-regulator having an ordinary diaphragm-plate, M, and showing my improvement applied in a different manner from that shown in Fig. 1, and also having the passage on the outside, which permits of the construction of the chamber as shown in Fig. 5, which is a horizontal section of Fig. 4 on line $z\,z$. Fig. 6 shows the form of guide to valve, and is a section on line $y\,y$ of Fig. 4. Fig. 7 shows my improvement with a piston used in place of a diaphragm, and the chamber H formed by two separate disks, and also has a side passage, $a$. Fig. 8 shows my improvement with a piston in place of a diaphragm and the valve opening into the chamber H. Fig. 9 shows my improvement with a puppet-valve opening at both ends, and a weight used instead of a spring for the purpose of resisting and regulating the pressure, also showing the usual form of diaphragm-plate, M. Figs. 10 to 19, inclusive, relate to means for the protection of a diaphragm. Fig. 10 is a cross-section on line $x\,x$ of Fig. 11. Fig. 11 is a plan of the under side of cover with the diaphragm-plate in place. Fig. 12 is a cross-section on line $y\,y$ of Fig. 11. Fig. 13 is a cross-section on line $z\,z$ of Fig. 11. Fig. 14 is a plan of the under side of cover. Fig. 15 is a plan of the diaphragm-plate. Figs. 16, 17, 18, and 19 show a modification in construction of my improved diaphragm-protector. Fig. 16 is a plan of under side of cover. Fig. 17 shows a plan of the under side of the cover and diaphragm-plate. Fig. 18 is a plan of the under side of the diaphragm-plate. Fig. 19 is a section of the cover and plate on line $x\,x$, Fig. 17.

Reference being made to Fig. 1, A is the casing of a valve; X is the inlet, and Y the outlet. P is the passage between them, which is shown open, but is closed when the valve B is down.

The valve B is provided with the passage $i$, and is made to slide up and down, guided by the casing and the guide C, which is preferably made of the form shown in Fig. 3, and enters the round hole F in the valve B.

D is an inside casing.

G is a chamber above the valve B, and by means of the holes or passages $o$ (shown in Fig. 2) the pressure passes into the chamber G' without entering the chamber H; or a passage may be formed on the outside, as shown in Fig. 7 at $a$, instead of the passages $o$.

$c$ is a passage connecting the pressure on the outlet side with the chambers H and L below and above the chamber G'.

I is a secondary valve. When down, as shown, it leaves an opening at the top, the bottom end being fitted like a piston, so as to easily move up and down in the hole formed in the separations H', and which communicate with the chamber H; and the seat for the valve I is formed in the screw-plug *h*, preferably to forming it in the separation O.

W is a diaphragm, which is held in place between the casing A and the cover E, and *s s* are portions of the diaphragm-plate, and *e e* are portions of the cover E.

*g* is a nut which attaches the connecting-piece *f* to the diaphragm, and the lower end of the connection *f* is connected with the secondary valve I.

N is a spring arranged to exert its force upon the diaphragm when compressed by the screw R, inserted in the cap T, which is connected with the cap E by means of a screw-thread.

Z is a screw for the purpose of facilitating the construction.

The chamber H is an important part of my invention, and may be formed in any suitable manner. In Fig. 7 it will be seen as a space formed by an upper and a lower disk, H', both connected to the casing by screw-threads, and having the communicating passage between the chambers G and G' formed outside of the disks which form the chamber H. The passage is shown at *a*, Fig. 7.

In Figs. 1 and 2 the chamber H is formed of one disk having a hole, H, drilled horizontally across the disk H', as shown by the dotted lines in Fig. 2, thus leaving the upper and lower sides of the chamber as shown in Fig. 1 by H'. This disk is then provided with a screw-thread around its edge, which engages with a similar thread in the casings A and D, for the purpose of holding the disk H' in place, and, as seen in Fig. 2, it is provided with passages *o o*, formed outside of the chamber H, and making communicating passages between the chambers G and G'.

In Fig. 5 the chamber H is formed as in Fig. 2; but the disk H' is without the passages *o o*, as shown in Fig. 2, the communication between the two chambers G and H, Fig. 4, being made by the passage *a* on the outside of the circle of the disk H'.

In Fig. 1 the chamber H is formed under the auxiliary valve I and communicates with the passage *c*, as does chamber L, while in Fig. 4 the chamber H is formed over the valve I, and communicates with the passage *a*, and thereby with the chamber G.

The diaphragm may be formed of any suitable material, and is protected from destruction by means which prevent undue action of the diaphragm caused by pressure or from carelessly removing the counter resisting pressure of the spring N or weight N', (shown in Fig. 9,) or by neglecting to adjust the counter-pressure to equal the pressure under the diaphragm. This I accomplish by forming the under side of the cover E, Fig. 14, with alternate projections *e* and recesses *p'*, (shown by the shaded lines,) and into these recesses are loosely fitted the projections *s* of the diaphragm-plate S, (shown in Fig. 15,) while the projections *e* on the under side of the cover, Fig. 14, are loosely fitted into the recesses *p* of the plate S, Fig. 15. The under side of the projections *e* on the under side of the cover E are slightly concaved toward the center, as shown by *e e* in Fig. 1, while the under side of the plate S is preferably convexed toward the center, as shown by *s s* in Fig. 1. It will thus be seen that when in position, with the diaphragm under the lower edge of the cover, there will be a gradually-increasing space between the diaphragm and the projections *e* on the cover from the outside edge inward toward the center, and this space may be graduated as desired. Then when the diaphragm-plate S is placed in position, resting on the diaphragm, with the projections *s* fitted within the spaces *p'* of the cover E, so as to rise and fall freely with the diaphragm, the diaphragm W, Fig. 1, cannot be destroyed or deranged, even if the spring N, Fig. 1, or the weight N', Fig. 9, is entirely removed, as in that case the pressure under the diaphragm could but raise it as far as the projections *e* on the under side of the cover E would permit.

Figs. 16, 17, 18, and 19 show a modification of this improvement in diaphragm-plates, pins being substituted for the projections shown and described, which are correspondingly lettered, and the action is the same.

It will readily be seen that this improvement in diaphragm-plates may be adapted to corrugated diaphragms by changing the form of projections to correspond with the corrugations, or to any other preferred form of diaphragm in any device in which a diaphragm is employed.

In order to illustrate my invention and show its operation, I have chosen a device for reducing and regulating pressure; yet it will be observed that I claim these improvements in their application in any form or as applied to any device for any purpose to which they may be adapted.

The operation of the device shown in Fig. 1, in which my improvement is embodied, is as follows: Steam or fluid entering at X will immediately raise the valve B to the position shown, as the area of the upper portion of the valve is greater than its lower portion, and as there is no pressure on the outlet side Y or in the passage *c*, and therefore no pressure in chamber L under the diaphragm, the spring N will have pressed the diaphragm down, and that, by means of the connection *f* with the auxiliary valve I, will have forced the valve I down, thereby opening a passage at the upper end of valve I through the upper separation, O, of chamber G' and the screw-plug *h* into the chamber L, whence the pressure will pass off by the communicating passage *c* to the outlet Y. Therefore the pressure or fluid, when the valve B is open, will pass through the passage P and outlet Y into the pipes, reservoir, or whatever else the outlet G is connected with, and at the same time the fluid or pressure will pass by the upper or piston portion of valve B or through the small passage $i$ into the chamber G above the valve B, and thence through the passages $o\ o$ into chamber G' without entering the chamber H, and as the auxiliary valve I is open at its upper end the pressure which passes by the valve B or through the small opening $i$ will have unobstructed passage off by the valve I, chamber L, and passage $c$ to outlet Y; but when the pressure in the outlet end Y, passage $c$, and chambers H and L has increased so as to equal and overcome the downward pressure of the spring N, then the diaphragm W will be forced upward, lifting the valve I and closing the passage by the valve between chambers L and G', thus preventing the escape of pressure from the chamber G, and in consequence the pressure above the valve B will soon equal the pressure below it, and the valve B will shut down and close the passage P, and thus prevent any increase of pressure on the outlet side. When the pressure becomes reduced on the outlet side from any cause, then the spring N will force the auxiliary valve I down, thus opening a passage for the escape of the pressure from chamber G or the upper side of the valve B, and the pressure from the inlet side X will force valve B up, opening the passage P and allowing the steam or fluid to pass through and out of the outlet Y until the pressure on that side again increases to such a degree as to overcome the spring N, and by means of the diaphragm W and connection $f$ cause the valve I to rise and close the outlet by the valve I into chamber L.

The importance of these improvements will be understood when it is considered that positive action with extreme sensitiveness and great durability are absolutely requisite in this class of machines; and in practical use it is found that the diaphragm is the weak point in all devices heretofore in use, and all are lacking in positive action, due to the fluctuations of pressure in contact with the auxiliary valve I—as, for example, were it not for the interposition of the chamber H, the lower end of the valve I would be in contact with the initial pressure, which is always subject to great fluctuation, and, in consequence, if the spring N were adjusted to resist a given pressure under the diaphragm in the chamber L, and also a given initial pressure under the lower end of the valve I, then, if the initial pressure under the valve I were to be changed, it follows that the equilibrium would be destroyed. Thus the importance of the interposition of the chamber H becomes apparent, as by it both ends of the valve I are always subject to equal pressure, and therefore the valve I is not affected by any changes in pressure, and positive sensitive action is assured.

Having thus fully described my invention, what I claim, and desire to secure by Letters Patent, is—

1. In a pressure-regulating device, the combination of a main valve, B, and a supplementary chamber, H, with a secondary valve, I, the said chamber being connected with both the top and bottom sides of the secondary valve, whereby the pressure upon the same is equal upon both sides, substantially as and for the purpose set forth.

2. In a pressure-regulating device, the combination of a cover having recesses with a diaphragm having a radial plate resting upon it, said radial plate being formed and adapted to fit the recesses made in the cover, substantially as and for the purpose set forth.

FLORENTINE A. JONES.

Witnesses:
M. W. FROTHINGHAM,
JOHN F. WAKEFIELD.